(12) United States Patent
Ochs et al.

(10) Patent No.: US 7,760,937 B2
(45) Date of Patent: Jul. 20, 2010

(54) AUTOMATIC CONVERSION OF FULL COLOR IMAGES TO HIGHLIGHT COLOR IMAGES

(75) Inventors: Matthew J. Ochs, Webster, NY (US); John A. Moore, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 782 days.

(21) Appl. No.: 11/693,348

(22) Filed: Mar. 29, 2007

(65) Prior Publication Data

US 2008/0239343 A1 Oct. 2, 2008

(51) Int. Cl.
G06K 9/00 (2006.01)
G06F 15/00 (2006.01)
H04N 1/60 (2006.01)

(52) U.S. Cl. ......................... 382/167; 358/1.9; 358/518

(58) Field of Classification Search .................. 382/162, 382/164, 165, 167, 254, 284; 358/1.9, 3.01, 358/3.04, 3.09, 3.2, 506, 515, 518, 520, 523, 358/525, 530, 534; 345/22, 88, 89, 150, 345/431, 582, 589, 591, 597, 600–604; 707/515, 707/523
See application file for complete search history.

(56) References Cited

U.S. PATENT DOCUMENTS

| | | | |
|---|---|---|---|
| 4,719,506 A * | 1/1988 | Van Buren | ................... 358/506 |
| 5,237,517 A | 8/1993 | Harrington et al. | |
| 5,568,248 A | 10/1996 | Wagley | |
| 6,115,493 A | 9/2000 | Harrington | |
| 6,185,013 B1 | 2/2001 | Harrington et al. | |
| 6,252,580 B1 | 6/2001 | Harrington | |
| 6,426,802 B1 | 7/2002 | Lin | |
| 6,542,913 B1 * | 4/2003 | Deriso et al. | ................. 715/235 |
| 6,671,479 B2 * | 12/2003 | Grenek et al. | ................ 399/223 |
| 6,721,069 B1 | 4/2004 | Harrington | |
| 6,989,839 B2 * | 1/2006 | Braun et al. | ................. 345/591 |
| 7,199,905 B2 * | 4/2007 | Sharma | ..................... 358/3.04 |
| 7,583,837 B2 * | 9/2009 | Herron | ...................... 382/162 |
| 2005/0225782 A1 * | 10/2005 | Livengood et al. | ............ 358/1.9 |
| 2008/0106749 A1 * | 5/2008 | Hartupee et al. | .............. 358/1.9 |
| 2008/0231902 A1 * | 9/2008 | Roome et al. | ................. 358/2.1 |
| 2008/0239343 A1 * | 10/2008 | Ochs et al. | .................... 358/1.9 |

* cited by examiner

Primary Examiner—Amir Alavi
(74) Attorney, Agent, or Firm—Oliff & Berridge, PLC

(57) ABSTRACT

A device and method for converting a multi-bit full color input image into a highlight color format for output on a highlight color image output terminal. The method and device analyze each pixel block on a block-by-block basis and assign each block to one of highlight color and non-highlight color. Each color is processed as a separate image file and can be combined after processing into a mixed raster file for output. At least the highlight color image portion can be converted to a single-bit file to reduce processing constraints.

20 Claims, 4 Drawing Sheets

HIGHLIGHT COLOR SEPARATION PLANE (R)

|   |   |   |   |
|---|---|---|---|
|   |   |   |   |
|   |   |   |   |
| R | R |   |   |
| R | R | R |   |

FIG. 4A

BLACK SEPARATION PLANE (K)

|   |   |   |   |
|---|---|---|---|
| K | K | K |   |
| K | K | K | K |
|   |   |   |   |
|   |   |   |   |

FIG. 4B

COMPOSITE SEPARATION PLANE (RK)

|   |   |   |   |
|---|---|---|---|
| K | K | K |   |
| K | K | K | K |
| R | R |   |   |
| R | R | R |   |

FIG. 4C

AUTOMATIC CONVERSION OF FULL COLOR IMAGES TO HIGHLIGHT COLOR IMAGES

BACKGROUND

This disclosure relates to systems and methods for converting full color images to highlight color.

A significant amount of color printing can be performed using a highlight color printer. In this type of printing, only two inks are used in the printing process. These inks comprise black and a highlight color (usually red or blue). Electronic printers may be designed specifically for highlight color painting. Highlight color printers are generally faster and less expensive than full color printers because only two inks are processed, as opposed to the three or four inks, which must be processed in order to obtain full color images. One such application is a teacher's edition textbook, which includes single color main text, such as black, and highlight color answers, printed in a highlight color such as red.

Images and text specifically created for highlight printing can typically be reproduced accurately. However, images created for other printer systems, such as full color printers, or highlight color images scanned or mapped into a 3-D color space, such as RGB, may not print with desirable results because the gamut of all of the image colors, shades, tints and hues cannot be faithfully reproduced by the highlight printer. Additionally, once mapped into a multi-bit, 3-D color space, such as RGB, processing becomes lengthy because of the large amount of data needed to represent the image. For example, what was once simple, two color image data is scanned into multi-bit image data.

The gamut of full colors is a three-dimensional volume that can be represented by a double hexagonal cone. In this representation, shades vary from dark to light as one moves upwards vertically. Tints vary from unsaturated grays to fully saturated colors as one moves out radially. Hues vary as one moves angularly in the horizontal plane.

The gamut of colors available to a highlight printer can be represented by the two-dimensional triangle. This is a slice from the fall color double hexagonal cone at the angle of the highlight hue.

Prior attempts to print a full color image on a highlight color printer typically involved specific mapping of the three-dimensional double hexagonal cone to the two-dimensional triangle. Examples of such conversions can be found in U.S. Pat. No. 6,115,493 to Harrington, U.S. Pat. No. 6,185,013 to Harrington et al., U.S. Pat. No. 6,721,069 to Harrington, U.S. Pat. No. 5,237,517 to Harrington et al., and U.S. Pat. No. 6,426,802 to Lin, the disclosures of which are hereby incorporated herein by reference in their entireties. In such systems, the printer makes its best effort to render the highlight color image by mapping the full color specification into the set of colors that it clan produce. In such a mapping, many different colors in the full color space will be mapped to the same color in the highlight color space.

SUMMARY

When images represented in a 3-D color space are output directly onto a highlight color image output device, such as a highlight printer, it is possible for highlight color and non-highlight color in the output to appear at the same location. This may result in a dulling of the appearance due to the mixing of colorants. That is, tints of a main colorant, such as black, may appear in small quantity with the highlight colorant, resulting in a change of appearance. Additionally, halftoning may further blur or alter the desired appearance of the image.

Further, because two separate printing processes are used to apply the separate colorants, it is possible that registration errors between the color layers may be introduced. This causes alignment problems that reduce the image quality of the resultant output.

Moreover, because of the large size of the input file due to the full color input color space, processing to map the color space to a reproducible highlight color output color space is often lengthy and memory intensive, typically requiring complicated look-up tables and the like.

According to exemplary aspects of the disclosure, full color input images are converted for output in a highlight color output color space using a non-highlight color and a highlight color by separating color components of the full color images from non-color components and processing each separately. In exemplary embodiments, the full color image is processed on a block-by-block basis, such as individual pixels or a block of pixels, with each block/pixel being assigned to only one of a highlight color and a non-highlight color to avoid overlap or mixing of highlight and non-highlight color.

Although processing of the base color and highlight color components can take several forms, exemplary embodiments process one or both of the components by converting multi-bit input data into a single bit binary output. For example, the base color may be pure white or black and the highlight color may be pure red or blue that can be expressed by a one-bit representation. This greatly reduces the size of the output file and processing time. Additionally, in accordance with exemplary embodiments, the color components can be represented by masks that can be later modified to any highlight color for output by a highlight printer, resulting in adjustable highlight color imaging. For example, pure red input could be mapped to an RGB color space of R=255, G=0, B=0, to achieve pure red highlight color output, or could be mapped to an RGB color space of R=0, G=0, B=255 to achieve pure blue highlight color output.

Exemplary embodiments create an image for output on a highlight color image output device where highlight color and non-highlight color do not overlap with each other. According to aspects of this disclosure, this may be achieved by dividing the input image into blocks of 1 or more pixels. The block of pixels can be any of a single pixel, a 2×2 block of pixels, or a 3×3 block of pixels, etc. Each block pixel of the inputted full color image is analyzed to determine whether the block should be rendered in highlight color or non-highlight color, if color is needed. Each block is rendered using a single one of the colors so overlap and mixing of color components is not possible. Error checking may be preformed on the analyzed blocks.

In exemplary embodiments, separate color masks may be created for highlight color blocks and non-highlight color blocks. The separate color masks representing different color planes, may be combined into a single output image without mixing highlight color and non-highlight color for any one pixel block. The rendered output image may be outputted in stored form, displayed form, or printed form using an image output terminal, such as a highlight color printer, so that none of the pixels of the outputted image contain a mixture of highlight color and non-highlight color.

In accordance with the disclosure, a method for converting a full color image to a highlight color image for output on an image output terminal includes: inputting a full color multi-bit image, wherein the full color image contains a plurality of pixel blocks; analyzing the inputted image on a block-by-block basis to determine whether each pixel block should be rendered in highlight color or non-highlight color; assigning each pixel block as one of highlight color and non-highlight color based on the analysis; separately processing assigned highlight color pixel blocks as a first image plane and assigned non-highlight color pixel blocks as a second image plane; combining the image planes to form an output file containing a highlight color image; and outputting the file containing the highlight color image to an image output terminal.

In accordance with aspects of the disclosure, a device for converting a full color image to a highlight color image for output on an image output terminal is provided. The device includes: an image input terminal that contains a full color image containing a plurality of pixel blocks; an image processing unit that receives the image from the image input terminal; and an image output terminal. The image processing unit includes: an analyzer circuit that analyzes each pixel block on a block-by-block basis to determine whether each pixel block should be rendered in highlight color or non-highlight color; an assigning circuit that assigns each pixel block to one or a highlight color and a non-highlight color based on the determination of the analyzer circuit; a highlight color processing circuit that processes the pixel blocks assigned as highlight color as a first image plane; a non-highlight color processing circuit that processes the pixel blocks assigned as non-highlight color as a second image plane, the non-highlight color processing being separate from the highlight color processing; and a combining circuit for combining the processed image planes for output as an output file to the image output terminal.

BRIEF DESCRIPTIONS OF THE DRAWINGS

Various exemplary embodiments will be described in detail with reference to the following drawings, wherein:

FIG. 4A illustrates an exemplary highlight color image separation plane containing separated highlight color-only regions of the scanned full color image of FIG. 3;

FIG. 4B illustrates an exemplary non-highlight color image separation plane containing non-highlight color-only regions of the full color image of FIG. 3;

FIG. 4C illustrates a mixed raster composite of the combined highlight and non-highlight image planes of FIGS. 4A-B;

DETAILED DESCRIPTION OF THE EMBODIMENTS

Figure 1:
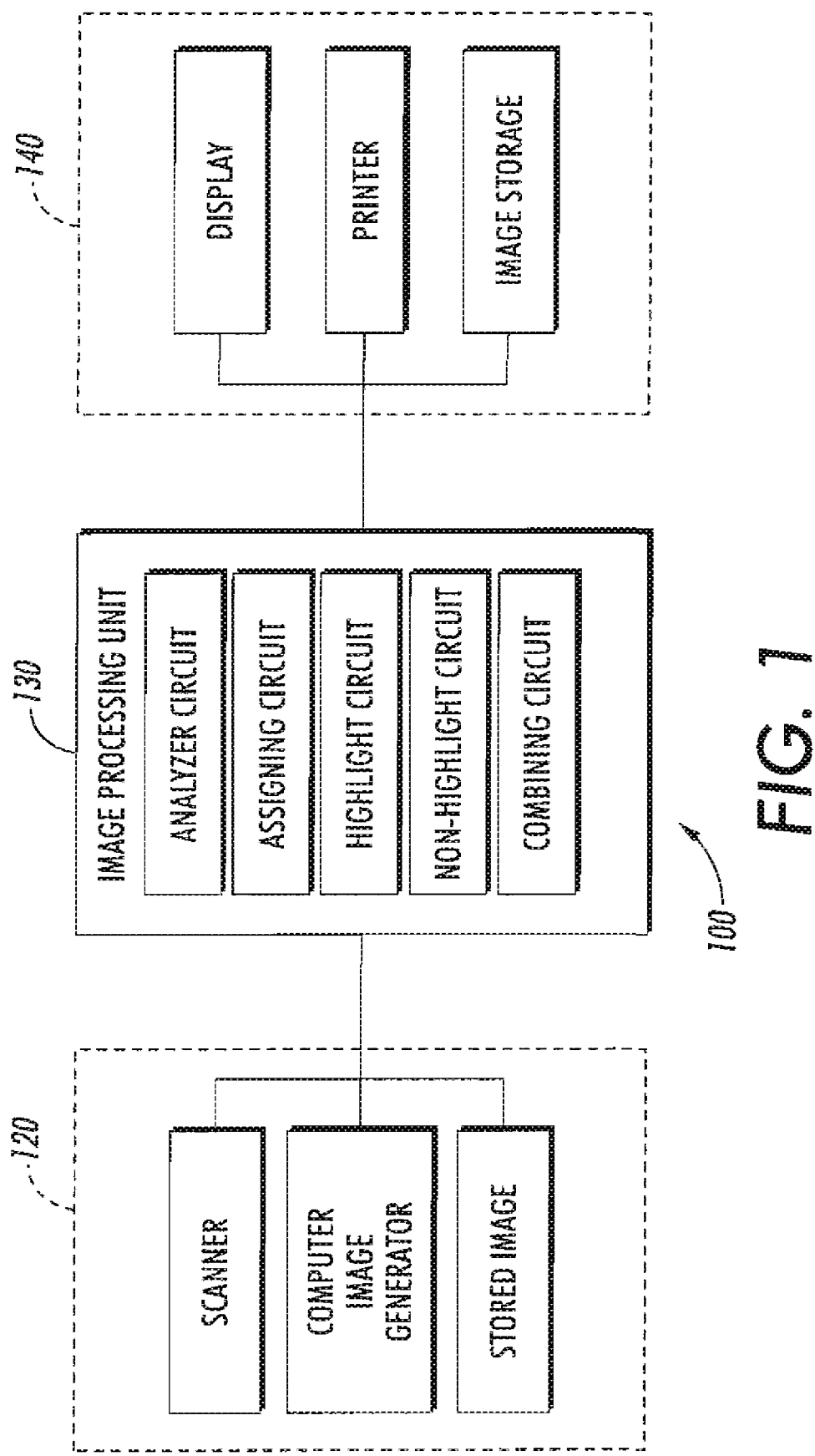
FIG. 1 is a diagrammatic illustration of an exemplary image processing system according to the disclosure.

With reference to FIG. 1, an image processing system 100 employs an image input terminal 120 to read or otherwise receive an input image portrayed in a full color coordinate system of a 3D color space. The image input terminal 120 optionally includes one or more suitable color image input devices, such as a scanner, a computer image generator, or an electronic or other stored image reader, or the like. In an exemplary embodiment, incoming or sampled colors from the input full color image are defined in a red-green-blue (RGB) color coordinate system. However, other input color coordinate systems are optionally employed, e.g., cyan-yellow-magenta (CYM), Lab, etc. In certain embodiments, an original image is generated in highlight color (i.e., black and one or more additional highlight colors), but scanned for reproduction purposes using a full color scanner that obtains a 24-bit full color RGB input image of the original.

An image processing unit 130 receives the input full color image, such as 24-bit RGB, from the image input terminal 120. The image processing unit 130 carries out various processing operations to convert the scanned full color image to a highlight color image containing only a base color (typically black or white) and at least one highlight color (typically red and/or blue). In an exemplary embodiment, image processing unit 130 includes an analyzer circuit, an assigning circuit, separate processing circuits for highlight and non-highlight color, and a combining circuit for combining the processing image portions into an output file, such as a mixed raster file.

An image output terminal 140 receives the converted highlight image from the image processing unit 130 and stores or outputs the image in the highlight color scheme. Image output terminal 140 includes one or more appropriate rendering engines, such as an image storage device, a digital printer, a video display monitor, or the like. In a particular exemplary embodiment, the image output terminal 140 is a highlight color printer that renders images with torso colors, including a selected highlight color (preferably, a primary color or other non-grayscale color) and a base color (preferably, black or white).

The word "printer" as used herein encompasses any apparatus, such as a digital copier, bookmaking machine, facsimile machine, multi-function machine, etc., in addition to ink jet, laser or other pure printers, which performs a print outputting function for any purpose.

Figure 5A:
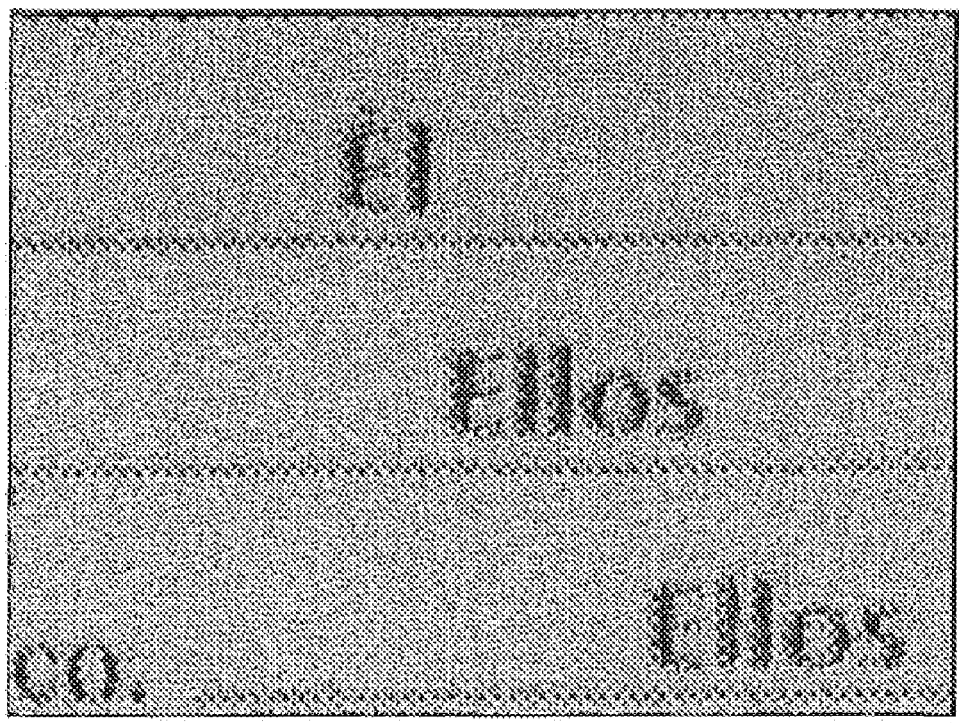
FIG. 5A shows a print output of an unprocessed tilt color image conventionally printed on a highlight color printer.

A problem with directly outputting a scanned full color image on a highlight color printer is that the printer cannot faithfully reproduce a full color image. Even when the original being scanned is a highlight color document, such as a teacher's edition book with answers in a highlight color, reproduction from the full color scanned copy can look dull or have minor registration problems that reduce image quality. An example of this is shown in FIG. 5A where a highlight color document has been scanned using a full color (24-bit) scanner and used as an input for directly printing on a highlight printer. Part of the problem is that some of the highlight color may be printed using a mix of black and red colorants. That is, a tint of black may appear in the image. This may make the image appear dull as pure highlight color is not used. Additionally, halftoning may blur the image as shown. Further potential image quality reduction may result from registration error due to imperfect alignment as a result of applying two different colors in two different processes onto the processed image.

Exemplary embodiments of the disclosure can achieve improvements in image quality by improving isolation of base color and highlight color portions of the input document. In accordance with certain aspects, a method of document conversion analyzes every pixel block of a full color input image and determines on a block-by-block basis whether the block should be rendered for output in highlight color or non-highlight color. Blocks of each type are then separated into different image planes, which are separately processed according to constraints pertinent to reproduction of that particular color. The planes may then be combined to be output on a highlight color image output terminal, such as a highlight printer. In embodiments each block is assigned a single color type.

Figures 2, 3:
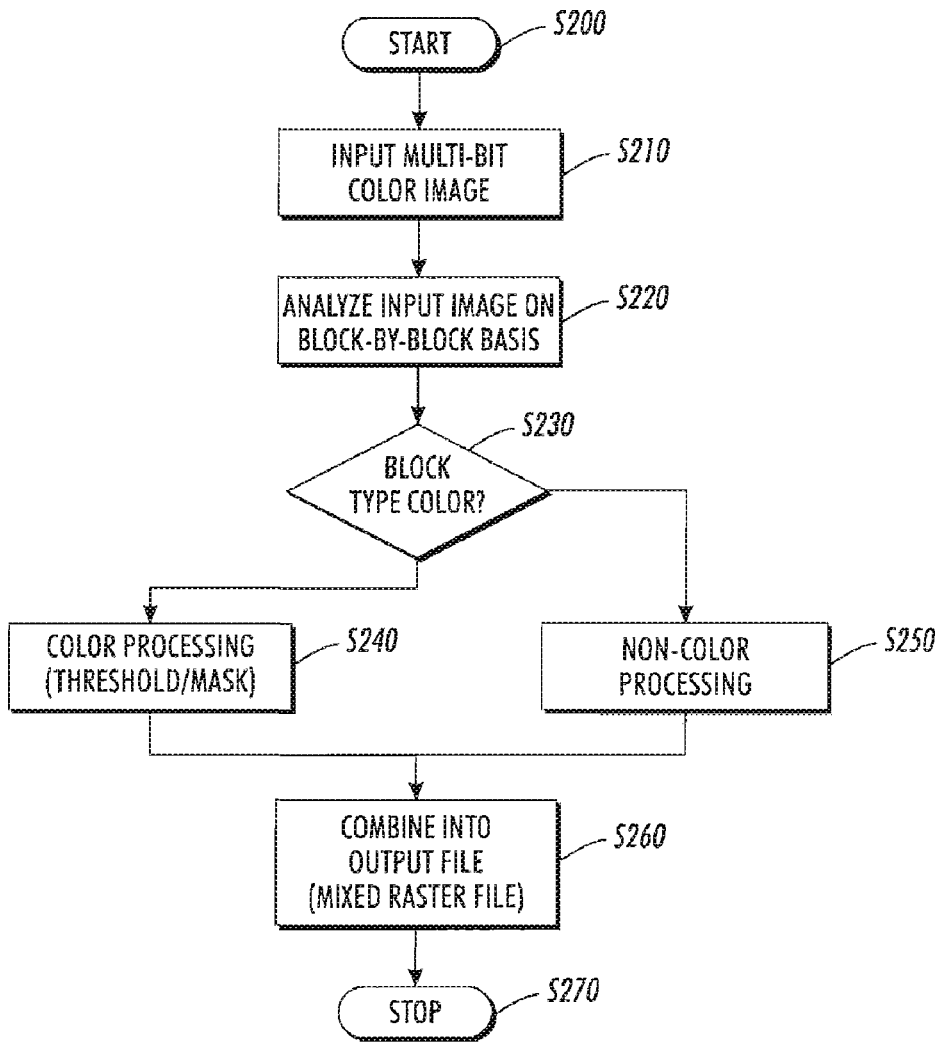
FIG. 2 illustrates an exemplary flow chart for converting a full color image into a highlight color image output format.
FIG. 3 illustrates an exemplary representative full color image map being scanned pixel-by-pixel for conversion.

An exemplary method for converting a full color image input to a highlight color output will be described with reference to FIG. 2. The process starts at step S200 and advances to step S210 where a full color image is received, such as by being input, scanned, or retrieved from memory at image input terminal 120. As a non-limiting example, the input may be a highlight color original document containing a non-color or base color, such as black or white, and at least one highlight color, such as red or blue, that has been scanned by a full color scanner into a 24-bit device independent color RGB image. Lower bit color images may be upconverted to 24-bit images and processed using the methods described. Other color spaces such as Lab or YCbCr may be converted to the RGB color space and then processed using the methods described.

From step S210, flow advances to step S220 where individual pixel blocks of the multi-bit input image are analyzed on a block-by-block basis. The size of the block may be an individual pixel, or may be composed of a 2-D matrix of pixels, such as a 2×2 or 3×3 matrix of non-overlapping adjacent pixels.

Every pixel block of the inputted document is analyzed to determine whether the block should be rendered in highlight color or non-highlight color (pixel blocks containing no image data can be assigned to either). The assignment of the pixel block may be based on various color space values, such as RGB value, Lab values, YCbCr values, CMYCK values, luminance, or HSV value when using an RGB color space.

One example of this would be to look at the multi-bit RGB values (which are assigned values of 0-255 for each of R, G, and B) and identify neutral pixels. A neutral pixel is one having substantially equal RGB values, indicating that the pixel should be rendered in the main, non-highlight color, such as black or white. Preferably, a range of values above and below a neutral balance are used to identify non-highlight colored pixels. For example, an input pixel may have values of R=200, G=210, and B=230. The neutral tolerance may be set to ±20. This pixel would not be neutral since the difference between the R and B value is greater than 20. Accordingly, this pixel would be rendered as a highlight color.

At step S230, each pixel block is analyzed. All blocks with values inside the range may be assigned as non-highlight color blocks and advanced to step S240 where they are separately processed as an independent color plane using any processing desirable to process the non-highlight color pixel data. This may include, for example, conversion to a scaled-down 8-bit image, a high resolution 1-bit image, maintaining a 24-bit image but reducing the resolution, compression using image formats such as CCITT4, JPEG, LZW and the like.

All values outside of the range may be assigned as highlight color blocks at step S230 and advanced to step S250 where they are separately processed as a second, independent color plane using any processing desirable to process the highlight color pixel data. Preferably, because this data represents highlight image data, the multi-bit representation is converted to a single bit representation for processing purposes (i.e., 1 representing highlight color present or 0 representing no color for this pixel).

If the pixel block contains a plurality of pixels, the pixels in the block may be analyzed to see if the majority fall within the neutral range. If the majority are neutral, then the block is rendered in non-highlight color. Otherwise, the block is rendered in highlight color. Error checking could be used. For example, if all the pixels in a block are of one color value except for a lone pixel, the lone pixel may be converted to match the rest of the pixels of the block.

After the various independent processing takes place at steps S240 and S250, the separate image planes may be combined into an output file, such as a mixed raster file type (PDF, XPS, JPEG 2000, XML and the like), at step S860. The conversion process ends at step S260.

Since no two pixel blocks overlap, every pixel within a block contains only one colorant. This avoids mixing of colorants and possible resultant blurring or dulling of the image. Additionally, because the image planes are separated, independent processing, particular to the particular color, can be performed. Moreover, because one or more of the image planes can be reduced to a lower bit image, memory size and processing demands can be greatly reduced. For example, an 11×17 inch 24-bit color image with a file size of 26.5 MB may be reduced to 88 KB file size if reduced to 1-bit information.

In accordance with various aspects, the separate image planes can forms masks, each of which can be adjustably modified prior to output to a variety of desirable output colors. For example, a blue highlight original may be isolated and converted to 1-bit data in the highlight color mask. However, during the formation of the output file, the mask can be assigned an arbitrary color value in any color space, such as red in an RGB color space by assigning indicated pixel blocks with a value of 1 to an RGB value of R=255, G=0, and B=0. Similarly, the non-highlight pixel blocks can be adjusted and assigned an arbitrary color, such as black or white.

The disclosure is not limited to a single highlight color output or input. Instead, if multiple highlight colors are present, a plurality of ranges of values may be assessed to determine identification of blocks assignable to one of the highlight colors. However, in all embodiments, each pixel block is assigned to a single color type.

Figure 5B:
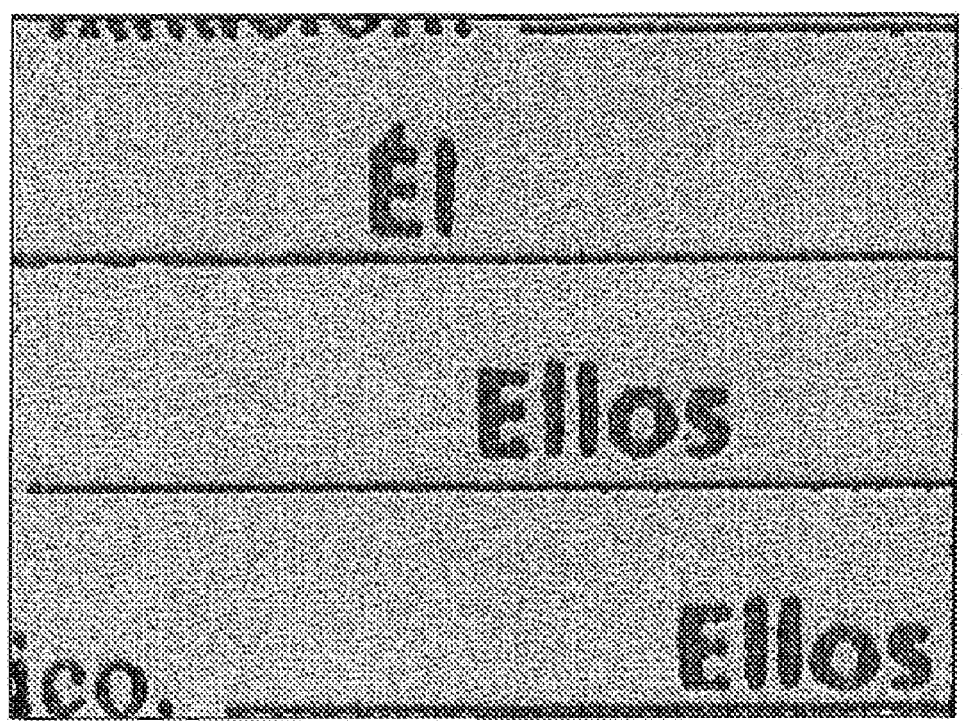
FIG. 5B shows a print output of a processed full color image on a highlight color printer in accordance with the disclosure.

An example of the analysis and separation of image planes will be described with reference to FIGS. 3 and 4A-C. FIG. 3 illustrates an exemplary input document that was originally a highlight color document from a teacher's edition textbook by a full color scanner for reproduction. It contains a question portion originally presented in black text, and an answer portion originally presented in highlight color, such as red or black. The image upon scanning is, however, a 24-bit full color version. For illustration purposes, the image is broken down into 16 pixel blocks, which could be individual pixels or a matrix of pixels. The analyzer circuit of image processing unit 130 analyzes each pixel block on a block-by-block basis to form the separated image planes shown in FIGS. 4A and 4B. FIG. 4A contains all pixel blocks determined to contain highlight color image data. FIG. 4B contains all pixel blocks determined to contain non-highlight color image data. Each plane can be separately processed and can become combined as shown in FIG. 4C upon processing. As clearly shown, each pixel block is assigned only a single type (R or K) and non-image bearing pixels could be assigned to either image plane as no data will be reproduced in these areas. The result of this processing is that the non-highlight pixel blocks are rendered solely using a first colorant, such as black or white, and the highlight pixel blocks are rendered solely using a second, highlight colorant, such as red or blue. The result is an improved rendering. An example of the improved rendering can be seen by FIG. 5B, which differs from that of FIG. 5A (directly printed on a highlight printer without processing based on a full color scan) by having reduced blurring, better edge and line detail, and sharper overall image.

It will be appreciated that various of the above-disclosed and other features and functions, or alternatives thereof, may be desirably combined into many unanticipated alternatives, modifications, variations or improvements therein may be subsequently made by those skilled in the art, and are also intended to be encompassed by the following claims.

What is claimed is:

1. A method for converting a full color image to a highlight color image for output on an image output terminal, the method comprising:
   inputting a full color multi-bit image, wherein the full color image contains a plurality of pixel blocks;
   analyzing the inputted image on a block-by-block basis to determine whether each pixel block should be rendered in highlight color or non-highlight color;
   assigning each pixel block as one of highlight color and non-highlight color based on the analysis;
   separately processing assigned highlight color pixel blocks as a first image plane and assigned non-highlight color pixel blocks as a second image plane;
   combining the image planes to form an output file containing a highlight color image; and
   outputting the output file containing the highlight color image to an image output terminal.

2. The method of claim 1, wherein each pixel block is a single pixel, or a matrix of adjacent pixels.

3. The method of claim 1, wherein the pixel blocks are non-overlapping.

4. The method of claim 1, wherein the assignment of each pixel block is based on any of RGB values, luminance and HSV values.

5. The method of claim 4, wherein values within a predetermined range of neutral color on the input color image are assigned as non-highlight color.

6. The method of claim 5, wherein values outside of the predetermined range are assigned as highlight color.

7. The method of claim 4, wherein values within a predetermined range of a desired highlight color on the input color image are assigned as highlight color.

8. The method of claim 1, wherein the highlight color pixel blocks are converted to 1-bit binary during processing.

9. The method of claim 8, wherein the highlight color image plane forms a mask and the 1-bit binary pixel blocks are assigned a specific color value in the output file.

10. The method of claim 1, wherein the color is one of red and blue.

11. A device for converting a full color image to a highlight color image for output on an image output terminal, the device comprising:
   an image input terminal that contains a fall color image containing a plurality of pixel blocks;
   an image processing unit that receives the image from the image input terminal, the image processing unit including
      an analyzer circuit that analyzes each pixel block on a block-by-block basis to determine whether each pixel block should be rendered in highlight color or non-highlight color;
      an assigning circuit that assigns each pixel block to one or a highlight color and a non-highlight color based on the determination of the analyzer circuit;
      a highlight color processing circuit that processes the pixel blocks assigned as highlight color as a first image plane;
      a non-highlight color processing circuit that processes the pixel blocks assigned as non-highlight color as a second image plane, the non-highlight color processing being separate from the highlight color processing; and
      a combining circuit for combining the processed image planes for output as an output file; and
   an image output terminal that receives the highlight color output file.

12. The device of claim 11, wherein each pixel block is a single pixel, or a matrix of adjacent pixels.

13. The device of claim 11, wherein the pixel blocks are non-overlapping.

14. The device of claim 11, wherein the assignment circuit bases assignment of each pixel block on any of RGB values, luminance and HSV values.

15. The device of claim 14, wherein values within a predetermined range of neutral color on the input color image are assigned as non-highlight color.

16. The device of claim 15, wherein values outside of the predetermined range are assigned as highlight color.

17. The device of claim 14, wherein values within a predetermined range of a desired highlight color on the input color image are assigned as highlight color.

18. The device of claim 11, wherein the highlight color pixel blocks are converted to 1-bit binary during processing.

19. The device of claim 18, wherein the highlight color image plane forms a mask and the 1-bit binary pixel blocks are assigned a specific color value in the output file.

20. The device of claim 19, wherein the color is one of red and blue.

* * * * *